United States Patent [19]

Ishida et al.

[11] Patent Number: 5,123,712
[45] Date of Patent: Jun. 23, 1992

[54] HYDRAULIC BRAKING SYSTEM WITH HYDRAULIC BOOSTER

[75] Inventors: Satoshi Ishida, Chiryu; Michiharu Nishii, Toyota, both of Japan

[73] Assignee: Aisin Seiki Kabushiki Kaisha, Kariya, Japan

[21] Appl. No.: 589,526

[22] Filed: Sep. 28, 1990

[30] Foreign Application Priority Data

Sep. 29, 1989 [JP] Japan .................. 1-256132

[51] Int. Cl.⁵ .............................................. B60T 13/14
[52] U.S. Cl. .................................... 303/10; 60/589
[58] Field of Search ............ 60/589, 551; 303/10, 303/114 R, 114 PB, 11

[56] References Cited

U.S. PATENT DOCUMENTS

| | | | |
|---|---|---|---|
| 4,582,365 | 4/1986 | Belart | 60/589 X |
| 4,641,891 | 2/1987 | Belart | 303/10 |
| 4,642,989 | 2/1987 | Belart | 60/551 |
| 4,649,707 | 3/1987 | Belart | 60/589 X |
| 4,671,066 | 6/1987 | Belart | 60/551 |
| 4,800,724 | 1/1989 | Asahara et al. | 60/560 |

FOREIGN PATENT DOCUMENTS

| | | |
|---|---|---|
| 3724896 | 2/1989 | Fed. Rep. of Germany ... 303/114 R |
| 59-209948 | 4/1984 | Japan . |
| 59-227552 | 5/1984 | Japan . |
| 2185299 | 7/1987 | United Kingdom ............ 303/114 R |

Primary Examiner—Robert J. Oberleitner
Assistant Examiner—Alfred Muratori
Attorney, Agent, or Firm—Burns, Doane, Swecker & Mathis

[57] ABSTRACT

A hydraulic braking system includes a master cylinder having a bore with an opening and a closed wall at opposite ends. At least one piston is slidably fitted in the bore and operatively connected to a brake pedal and at least one pressure chamber is defined in the bore by the piston and in communication with wheel cylinders of the vehicle. A normally open valve is associated with the piston so as to close a passage communicating between a reservoir and the pressure chamber when the piston is moved in response to the depression of the brake pedal. A hydraulic booster actuates the master cylinder in response to depression of the brake pedal, and an interrupting device interrupts the communication between the pressure chamber and the reservoir before the normally open valve closes the passage means and is interposed between the pressure chamber and the reservoir. Thereby, the idle stroke of previous master cylinders is eliminated. As a result, the initial stroke of the brake pedal is reduced and a light brake actuation feel is obtained.

6 Claims, 2 Drawing Sheets

HYDRAULIC BRAKING SYSTEM WITH HYDRAULIC BOOSTER

BACKGROUND OF THE INVENTION

1. Field of the Invention

The present invention relates to a braking system for use in an automotive vehicle and particularly to a hydraulic braking system having a master cylinder and a hydraulic booster which outputs or transmits hydraulic power pressure, supplied from a power source, in response to the depression of a brake pedal.

2. Description of the Related Art

In conventional service braking systems for automotive vehicles, a plurality of hydraulic circuits are provided for connecting wheel brake cylinders mounted on road wheels of the vehicle with a hydraulic braking pressure generator such as a master cylinder. In the event that one of the hydraulic circuits is broken or inoperative, the braking operation is achieved by the remainder of the hydraulic circuits. In general, a tandem master cylinder is used in conventional dual circuit brake systems.

In order to reduce the force required to operate a brake pedal during the braking operation, the hydraulic braking system is provided with a servo unit which is referred to as a servo or a booster and which utilizes compressed air, intake manifold vacuum (for a vacuum booster), or hydraulic pressure (for a hydraulic booster) as a power source. The hydraulic booster is a booster which actuates the hydraulic braking pressure generator, such as the master cylinder, by the hydraulic power pressure supplied from the power source in response to depression of the brake pedal. For example, the Japanese patent Laid-open publication No. 59-209948 discloses a system connecting the hydraulic booster to the tandem master cylinder which will operate as an ordinary tandem master cylinder when the hydraulic booster is not operative.

It has been proposed to employ the hydraulic booster as a dynamic hydraulic pressure generator in addition to the master cylinder. In other words, a hydraulic pressure boosted by the booster (hereinafter referred to as boost pressure) in response to the depression of the brake pedal is applied directly to a hydraulic circuit. For example, as shown in Japanese Patent Laid-open publication No. 59-227552, boost pressure from the hydraulic booster is applied to rear wheel brake cylinders in a front-rear dual hydraulic circuit system in order to reduce the travel stroke of the brake pedal.

Further, it has been proposed to connect one of the pressure chambers of the tandem master cylinder with the wheel cylinders of one of the hydraulic circuits and to connect the boost pressure of the hydraulic booster to the wheel cylinders of the other hydraulic circuit through the other pressure chamber of the tandem master cylinder. Such a hydraulic braking system is disclosed in U.S. Pat. No. 4,800,724. According to this system, various effects such as shortening the travel stroke of the brake pedal and so on are obtained.

In the above described prior art, (Japanese Patent Laid-open publication No. 59-227552), however, since the boost pressure of the hydraulic booster, i.e., the dynamic hydraulic pressure is directly supplied to the rear wheel cylinders, the travel stroke of the brake pedal is reduced when generating the hydraulic pressure to be provided to the rear wheel cylinders. However, the hydraulic pressure to the front wheel cylinders is not generated until a normally open valve operator for a piston causes the piston to operate and interrupt the fluid communication between a fluid chamber and a pressure chamber. Therefore, an initial idle stroke exists in the brake pedal operation and the travel stroke of the brake pedal cannot be reduced. In U.S. Pat. No. 4,800,724, the boost pressure, i.e., the dynamic hydraulic pressure is directly supplied to the wheel cylinders of the other hydraulic circuit via a second fluid chamber and a second pressure chamber except during abnormal operating conditions. Accordingly, the stroke of the brake pedal generating the hydraulic pressure for the wheel cylinders of the other hydraulic circuit is reduced. However, a first pressure chamber is in communication with a reservoir through a compensating port until a piston is moved so as to close the fluid communication between the reservoir and the first pressure chamber due to a cup seal provided on the piston. Due to this arrangement, an initial idle stroke exists in the brake pedal operation.

SUMMARY OF THE INVENTION

It is, therefore, an object of the present invention to reduce or eliminate the stroke of the brake pedal by decreasing the idle stroke of the master cylinder.

It is another object of the present invention to reduce the stroke of the brake pedal by decreasing the idle stroke of the master cylinder without changing the structure of the ordinary master cylinder braking pressure to the wheel cylinders.

It is a further object of the present invention to improve the brake feel.

In order to achieve these objects, there is provided an improved hydraulic braking system which includes a master cylinder having a bore with an opening and a closed wall at opposite ends thereof. At least one piston is slidably fitted in the bore and operatively connected to a brake pedal. At least one pressure chamber is defined in the bore by the piston and is in communication with the wheel cylinders. A normally open valve is associated with the piston so as to close a passage extending between a reservoir and the pressure chamber when the piston is moved in response to the depression of the brake pedal.

A hydraulic booster actuates the master cylinder in response to depression of the brake pedal. An interrupter is provided for interrupting the fluid communication between the pressure chamber and the reservoir before the normally open valve closes the passage extending between the pressure chamber and the reservoir.

BRIEF DESCRIPTION OF THE DRAWINGS

Additional objects and advantage of the present invention will become more apparent from the following detailed description of preferred embodiments thereof when considered with reference to the attached drawings, in which.

DETAILED DESCRIPTION OF THE PREFERRED EMBODIMENTS

A hydraulic braking system constructed in accordance with one of the embodiments of the present invention will be described with reference of the drawings.

Figure 1:
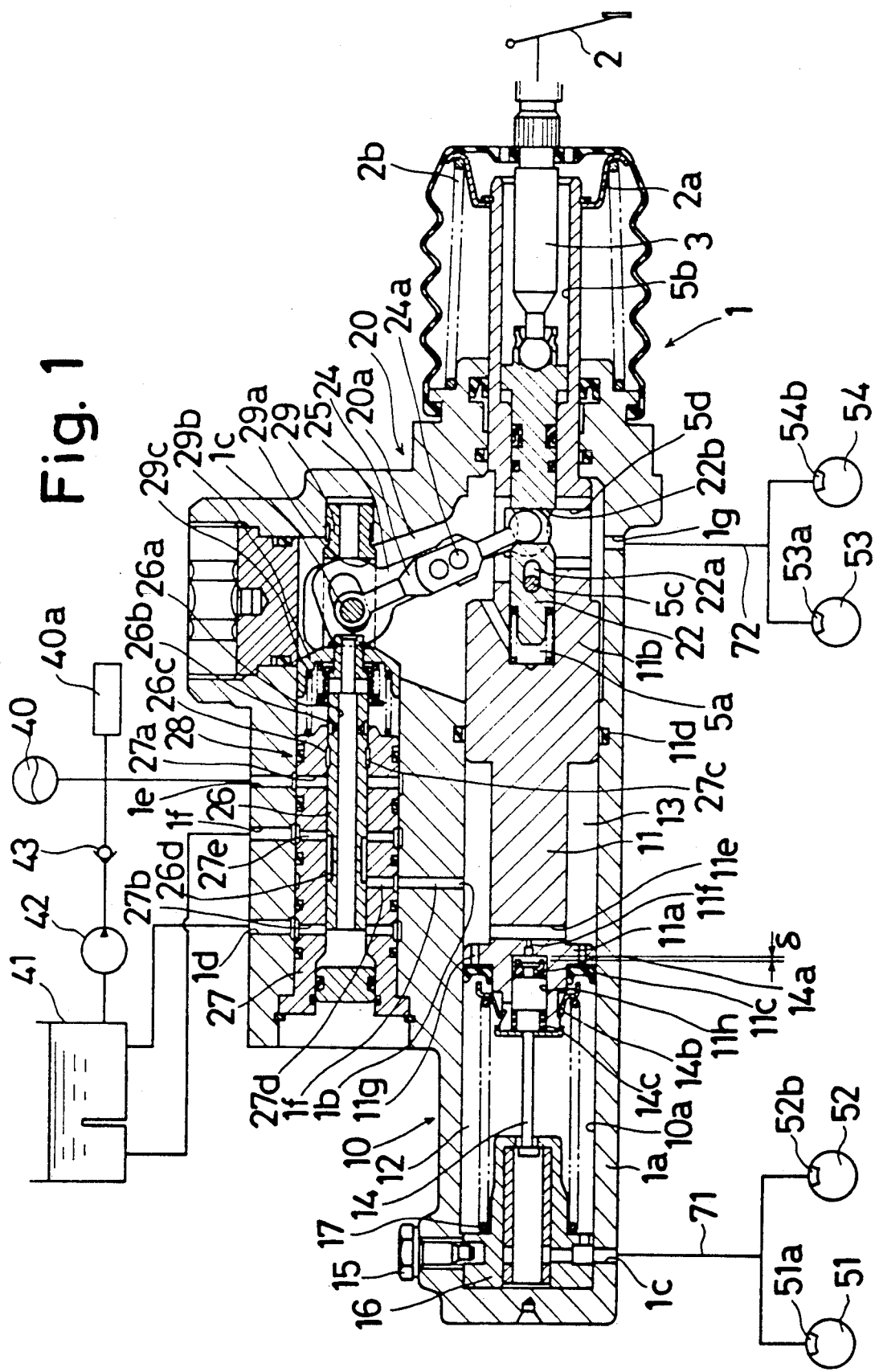
FIG. 1 is a schematic illustration of a hydraulic braking system of a first embodiment of the present invention.
Figure 2:
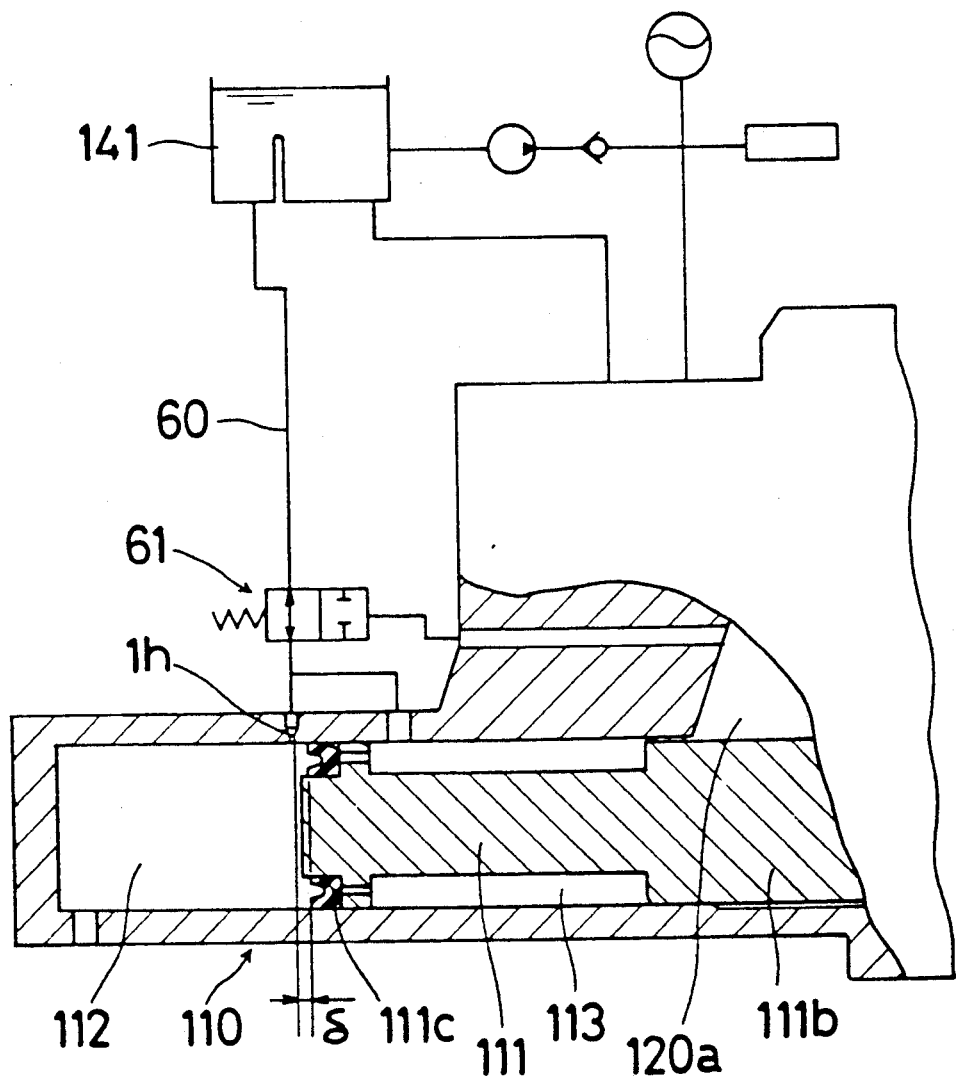
FIG. 2 is a schematic illustration of a portion of a hydraulic braking system of a second embodiment of the present invention.

Referring to a FIG. 1, there is schematically illustrated a hydraulic braking pressure generator 1 which includes a master cylinder 10 and a hydraulic booster 20. As a result, a depression force applied to a brake pedal 2 is transmitted as a brake operating force to an input rod 3. In response to this brake operating force, hydraulic pressure introduced from an accumulator 40 of a power source or a reservoir 41 is appropriately regulated and applied to wheel cylinders 51a, 52b, 53a and 54b of front wheels 51 and 52 and rear wheels 53 and 54 through a first hydraulic passage 71 and a second hydraulic passage 72.

In this embodiment, the master cylinder 10 is a single master cylinder which includes a housing 1a with a bore 10a. In the bore 10a, a piston 11 is slidably and fluid-tightly positioned therein. A land portion 11a and a power piston portion 11b are at opposite ends of the piston. A cup seal 11a is fitted on the land portion 11a of the piston 11 and the land portion 11a of the piston 11 is slidably and fluid-tightly positioned in the bore 10a. The power piston portion 11b is slidably and fluid-tightly positioned in the bore 10a via a seal member 11d fitted in an inner circumferential portion of the bore 10a. Thereby, a fluid chamber 13 in communication with the reservoir 41 via a port 1b is defined between the land portion 11a and the power piston 11b in the bore 10a. Also, a pressure chamber 12 is formed between the land portion 11a and an end wall of the bore 10 and is in communication with the wheel cylinders 51a and 52a of the front wheel 51 and 52 via a port 1c and the first hydraulic passage 71, respectively.

The piston 11 has a hole or cavity 11h extending axially along its centerline with respect to the end wall of the bore 10. Furthermore, a hole or bore 11e is formed radially through the piston 11 and communicates with the hole 11h through a reduced diameter axially extending bore 11f. A valve member 14a is provided in one end portion of a valve rod 14 and is movably received in the hole 11h. The valve member 14a is restricted from moving towards the end wall of the bore 10 by a retainer 14b mounted on the piston 11. Axial bores 11g are formed in the land portion 11a of the piston 11 and the cup seal 11c covers open ends of the bores 11g. As a result, a check valve is constituted by bores 11g and the cup seal 11c. A spring 14c is interposed between the retainer 14b and the valve member 14a so as to continually urge the valve member 14a toward the bore 11f.

A holder 16 is positioned against the end wall of the bore 10 and is secured by a stopper bolt 15. Another end portion of the valve rod 14 is disposed in the holder 16 so as to engage and to disengage therewith. A return spring 17 is interposed between the retainer 14b and the holder 16 so as to continually urge the piston 11 toward the opening of the bore 10a. Thus, opposite end portions of the valve rod 14 are normally in engagement with the retainer 14b and the holder 16, respectively. Under these conditions, the valve member 14a is separated from the bore 11f by a predetermined distance δ and brake fluid supplied from the reservoir 41 to the fluid chamber 13, through the port 1b is transmitted to the pressure chamber 12 through the bores 11g or the bores 11c, 11f and 11h. Thus, when the piston 11 is moved more than a predetermined distance δ towards the end wall of the bore 10a against the urging force of the return spring 17, the cup seal 11a and the valve member 14a close the bores 11g and 11f, respectively, so that the pressure chamber 12 is only in communication with the port 1c. Accordingly, the pressure of the brake fluid in chamber 12c is increased in response to movement of the piston 11.

In the housing 1a, a boost chamber 20a of the hydraulic booster 20 is defined, and is in communication with the bore 10a. In the side of the bore 10a extending toward the boost chamber 20a, the power piston portion 11b is fluid-tightly and slidably disposed. The power piston portion 11b is provided with a retainer 2a at its end extending toward the brake pedal 2, and a spring 2b is mounted between the retainer 2a and the housing 1a so as to normally urge the power piston portion 11b (the piston 11) toward the brake pedal 2. The power piston portion 11b has at its middle portion a shoulder portion which abuts on the housing 1a to restrict the power piston portion 11b from sliding toward the brake pedal 2.

In the power piston portion 11b, a stepped bore is provided axially in the center thereof. The stepped bore comprises a small diameter bore 5a and a large-diameter bore 5b. In the small diameter bore 5a, a reaction piston 22 is slidably received, and a space formed between the bottom surface of the small diameter bore 5a and the head portion of the reaction piston 22 is in communication with the boost chamber 20a. In this embodiment, the boost chamber 20a is in communication with the wheel cylinders 53a and 54a of the rear wheels 53 and 54 via a port 1g and the second hydraulic passage 72, respectively.

In the reaction piston 22, an elongated hole or opening 22a is provided to extend coaxially with the axis of the reaction piston 22, and a through-hole 22b extends perpendicularly to the elongated hole 22a. A pin 5c, fixed to the power piston portion 11b, is disposed in the elongated hole 22a, so that the reaction piston 22 is restricted from sliding toward the brake pedal 2 with respect to the power piston portion 11b. One end of an input rod 3 is connected to the brake pedal 2, and the other end of the input rod 3 is provided with a spherical head which is inserted or connected in the large diameter bore 5b of the power piston portion 11b and received in the recess of the reaction piston 22, and which is engaged with the projection formed on the inner surface of the recess. The power piston portion 11b has a radial through-hole 5d which is aligned with the through-hole 22b when the reaction piston 22 is positioned most closely to the brake pedal 2 and which is larger in diameter than the through-hole 22b.

A support lever 24 is pivotally connected at one end to the housing 1b by a pin 1c for pivotal movement within the boost chamber 20a, and a spherical head of the support lever 24 is fitted into the through-hole 22b of the reaction piston 22. A control lever 25 is pivotally connected with the support lever 24 by a pin 24a approximately in its center, and one head of the control lever 25 is fitted into the through-hole 5d of the power piston portion 11b. In the other end of the control lever 25, an elongated opening is provided around the pin 1c of the support lever 24. Accordingly, when the reaction piston 22 slides in the direction of the end wall of the bore 10a with respect to the power piston portion 11b which is pressed toward the brake pedal 2. a rotating force is exerted on the support lever 24 so as to pivotally move the support lever 24 clockwise about the pin 1c. At the same time, since one head of the control lever 25 is retained in the through-hole 5f of the power piston portion 11b, the other head of the control lever 25 is rotated counterclockwise about the pin 24a and hence moved in the direction of movement of the reaction piston 22. As a result, the other head of the control lever 25 is displaced in response to movement of the reaction piston 22 until it comes into contact with the end surface of the large diameter hole 5b.

The housing 1a has a spool-valve bore extending substantially in parallel with the power piston portion 11b and communicating with the boost chamber 20a, and a spool valve 28 which functions as a hydraulic pressure control valve is fitted into the spool-valve bore. The spool valve 28 has a spool 26 slidably received in a spool bore formed in a cylinder 27 substantially in parallel with the power piston portion 11b. A bore 26a is axially formed in the spool 26, and orifices 26b, in communication with the bore 26a, are radially spaced around the spool 26. One end of the spool 26 is positioned in the boost chamber 20a and is connected with one end of a control rod 29. Another end of the control rod 29 is slidably supported in the housing 1a and a hole 29a is radially formed in the control rod 29. In the hole 29a, a head portion of the control lever 25 is disposed.

A spring 29c is interposed between the cylinder 27 and a retainer 29b which is supported on one end of the control rod 29 so as to urge the spool 26 toward the control lever 25. In the connecting portion between the spool 26 and the control rod 29, the bore 26a is in continual communication with the boost chamber 20a.

In the stop position of the control lever 25 shown in FIG. 1, another end of the bore 26a of the spool 26 is in communication with the reservoir 41 via a port 27b which is radially formed in the cylinder 27 and a drain port 1d which is provided in the housing 1a. Accordingly, the spool 26 is held in its stop position shown in FIG. 1 and the boost chamber 20a is in communication with the reservoir 41. In the cylinder 27, a port 27a is formed at control rod side 29 so as to be removed from the port 27b by a predetermined distance. The port 27a is in communication with the accumulator 40 via a port 1e which is formed in the housing 1a. However, the port 27a is closed off by the outer circumferential surface of the spool 26. In the cylinder 27, a circular groove 27c is formed between the port 27a and an end of the cylinder 27 on the side of the boost chamber 20a. A circular groove 26c is formed on the outer surface of the spool 26 so as to oppose the circular groove 27c.

In this embodiment, a port 27d is provided in the cylinder 27, and the port 27d is in communication with the fluid chamber 13 via a communicating port 1f in the cylinder 27 and a port 1b in the housing 1a. Furthermore, a port 27e which is in communication with the reservoir 41 via a port 1f is formed in the cylinder 27. A circular groove 26d is formed on the outer surface of the spool 26 so as to communicate the port 27d with the port 27e when the control lever 25 is positioned in its stop position. The circular groove 26d, the port 27d and the port 27e are constructed as an interrupting means in the present invention. In the opening extending in the opposite direction of the cylinder 27, a plug is fluid-tightly fitted so as to seal the bore 26a from the atmosphere.

The hydraulic pressure control valve 28 is operated by the control lever 25 and the hydraulic power pressure of the accumulator 40 of the power source supplied to the boost chamber 20a via a port 1e and the port 27a is controlled to a predetermined pressure. The boost chamber 20a is in communication with the reservoir 41 when the hydraulic booster 20 is in its initial position, and the boost chamber 20a is in communication with the reservoir 41 through a drain port 1d for returning the superfluous brake fluid when the hydraulic pressure of the boost chamber 20a is at the boost pressure.

The power source comprises an accumulator 40 for generating a hydraulic power pressure along with a fluid pump 42 which is connected to the accumulator 40 via a check valve 43 and connected to the reservoir 41 which stores a predetermined supply of hydraulic fluid. The power source is constructed so as to supply the power hydraulic pressure via the accumulator 40. The fluid pump 42 is operated by a motor (not shown) which is actuated by an electric control signal from an electric control device (not shown). The power hydraulic pressure is maintained at the predetermined pressure value by being intermittently controlled by the motor and the electric control device in response to the electric control signal from a pressure sensor 40a.

The above-described embodiment of the hydraulic braking system 1 operates as follows. FIG. 1 shows a condition under which the brake pedal 2 is not depressed. In this condition, since the fluid chamber 13 is in communication with the reservoir 41, which is in fluid communication with the pressure chamber 12, which is in communication with the wheel cylinders 51a and 52b of the front wheel 51 and 52, the brake fluid which is filled therein (in one of the hydraulic circuits) is at the pressure of the reservoir 41, namely atmospheric pressure. When the power source is operated, the hydraulic power pressure of the accumulator 40 is supplied to the port 1e. But, in this condition, since the port 27a is closed, the hydraulic booster 20 is not operated.

When the brake pedal 2 is depressed, the reaction piston 22 is pushed via the input rod 3. The reaction piston 22 is moved until the reaction piston 22 abuts the power piston portion 11b. Then, the control lever 25 is rotated counterclockwise about the pin 24a with respect to the support lever 24 so that the head of the control lever 25 pushes the spool 26. Thereby, the spool 26 is moved toward the left as shown in FIG. 1, and the port 27b is closed. Simultaneously, the port 27a is in communication with the orifices 26b via circular grooves 26c and 27c. As a result, the hydraulic power pressure from the accumulator 40 is introduced into the boost chamber 20a so as to push the power piston 5 and apply the boost force to the piston 11 so that the reaction force is transmitted to the brake pedal 2 via the reaction piston 22.

At the same time, the hydraulic power pressure is supplied from the port 1g to wheel cylinders 53a and 54b via the second hydraulic passage 72. Thereby, the initial stroke of the brake pedal 2 for actuating wheel cylinders 53a and 54a is reduced and a light brake actuation feel is obtained.

In this embodiment, at the same time, when the spool 26 is moved toward the left as shown in FIG. 1, fluid communication between the circular groove 26d and the port 27e is interrupted and fluid communication between the fluid chamber 13 and the reservoir 41 is interrupted. Thereby, the fluid chamber 13 and the pressure chamber 12 define a sealed space before the piston 11 is moved the predetermined distance δ and, the power piston portion 11b is actuated by the hydraulic power pressure during the sealed condition of the chambers 12 and 13. Thereby, the hydraulic brake pressure is output to the wheel cylinders 51a and 52a in response to the movement of the piston 11 as soon as the piston 11 is moved by the hydraulic power pressure. Accordingly, the initial stroke of the brake pedal 2 is further reduced and the light brake actuation feel is obtained.

The hydraulic pressure of the boost chamber 20a is at the predetermined boost pressure by the spool valve 28, due to the operation of the control lever 25 in response to relative displacement of the power piston portion 11b to the reaction piston 22. At this time, even though a leak is generated during the sliding clearance between the spool 26 and the cylinder 27, the hydraulic brake pressure of the pressure chamber 12 is maintained by the valve member 14a.

Next, another embodiment of the hydraulic braking system of the present invention is explained. In this embodiment, the pressure chamber 112 of the master cylinder 110 is in communication with the reservoir 141 via a compensating port 1h and a communicating passage 60 when the master cylinder 110 is not operated. A changeover valve 61 which is changed over between a first position and a second position by the hydraulic power pressure of the boost chamber 120a is disposed in the communicating passage 60. The changeover valve 61 communicates the reservoir 141 with the pressure chamber 112 at the first position when the hydraulic booster is not operated and interrupts the fluid communication between the reservoir 141 and the pressure chamber 112 when the hydraulic booster is operated.

Accordingly, in this embodiment, as mentioned above, the changeover valve 61 is changed over to its second position as soon as the hydraulic power pressure is supplied to the boost chamber 120a by the operation of the hydraulic booster. Thereby, the pressure chamber 112 becomes a sealed space before the piston 111 is moved through the predetermined distance so as to pass the cup seal 11c on the compensating portion 1h and the power piston portion 111b is actuated by the hydraulic power pressure under the sealed condition or position of the seal. Thereby, the hydraulic brake pressure is output to the wheel cylinders in response to the movement of the piston 111 as soon as the piston 111 is moved by the hydraulic power pressure. Accordingly, the initial stroke of the brake pedal is reduced and the light brake actuation feel is obtained.

In the above mentioned embodiments of the hydraulic braking system of the present invention operation with a single master cylinder is explained. However, the present invention of the hydraulic braking system can include a tandem master cylinder. Further, in the above mentioned embodiments, the power piston of the hydraulic booster is formed with the piston of the master cylinder as one body. However, it is possible to separate the power piston of the hydraulic booster from the piston of the master cylinder.

According to the present invention, it is possible to dispense with the idle stroke of the master cylinder, thereby, the initial stroke of the brake pedal is reduced and the light brake actuation feel is obtained.

Furthermore, according to the present invention, the above advantages can be obtained without substantially changing the structure of prior master cylinders. Therefore, the structure of the hydraulic braking system is simple and manufacturing cost is low.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A hydraulic braking system comprising:
    a master cylinder having a bore with an opening and a closed wall at opposite ends thereof, at least one piston slidably disposed in the bore and operatively connected to a brake pedal, at least one fluid chamber and at least one pressure chamber defined in the bore by the piston, normally open valve means disposed in the piston for closing a passage in the piston and providing communication between the fluid chamber and the pressure chamber when the piston is moved in response to depression of the brake pedal,
    a power source for generating a hydraulic power pressure,
    a hydraulic booster means for producing the hydraulic power pressure supplied from the power source and outputting an output pressure in response to depression of the brake pedal and transmitting a boost force to the master cylinder, said hydraulic booster comprising a hydraulic control valve that includes a slidable valve member,
    a plurality of wheel cylinders for braking respective road wheels, said plurality of wheel cylinders being divided into a first group of wheel brake cylinders connected with a first hydraulic circuit and a second group of wheel brake cylinders connected with a second hydraulic circuit, the pressure chamber communicating with at least one of said hydraulic circuits, and
    interrupting means for interrupting communication between the pressure chamber and a reservoir before the normally open valve means closes the passage in the piston, said interrupting means being interposed between the pressure chamber and the reservoir, and said interrupting means including a groove formed on an outer surface of said valve member for establishing and interrupting communication between the pressure chamber and the reservoir in dependence upon the position of the valve chamber.

2. A hydraulic braking system as recited in claim 1, wherein the hydraulic booster further comprises a housing connected with the master cylinder, and a power piston slidably disposed in a boost chamber of the housing and transmitting the boost force to the master cylinder in response to the depression of the brake pedal, said valve member being movable between a power position which communicates the power source and the boost chamber and a stop position which communicates the reservoir with the boost chamber, wherein the interrupting means interrupts communication between the pressure chamber and the reservoir before the normally open valve means closes the passage means when the valve member is positioned in the power position.

3. A hydraulic braking system as recited in claim 2, wherein the hydraulic control valve is a spool valve.

4. A hydraulic braking system as recited in claim 3, wherein said valve member is a spool member that communicates the reservoir with the pressure chamber in said stop position and interrupts the reservoir from the pressure chamber in the power position.

5. A hydraulic braking system comprising:
 a master cylinder having a bore with an opening and a closed wall at opposite ends thereof, at least one piston slidably disposed in the bore and operatively connected to a brake pedal, at least one fluid chamber and at least one pressure chamber defined in the bore by the piston, normally open valve means disposed in the piston for closing a passage in the piston and providing communication between the fluid chamber and the pressure chamber when the piston is moved in response to depression of the power pedal;
 a power source for generating a hydraulic power pressure;
 hydraulic booster means for producing the hydraulic power pressure applied from the power source and outputting an output pressure in response to depression of the brake pedal and transmitting a boost force to the master cylinder;
 a plurality of wheel cylinders for braking respective road wheels, said plurality of wheel cylinders being divided into a first group of wheel brake cylinders connected with a first hydraulic circuit and a second group of wheel brake cylinders connected with a second hydraulic circuit, the pressure chamber communicating with at least one of said hydraulic circuits; and
 interrupting means for interrupting communication between the pressure chamber and a reservoir, independent of the hydraulic power pressure, before the normally open valve means closed the passage in the piston, said interrupting means being interposed between the pressure chamber and the reservoir.

6. A hydraulic braking system according to claim 5, wherein said hydraulic booster means includes a hydraulic control valve, said hydraulic control valve including a slidable valve member, said interrupting means being defined by said valve member.

* * * * *